May 13, 1941.    W. A. KIMBALL    2,242,078
ROD COUPLING
Filed April 17, 1940
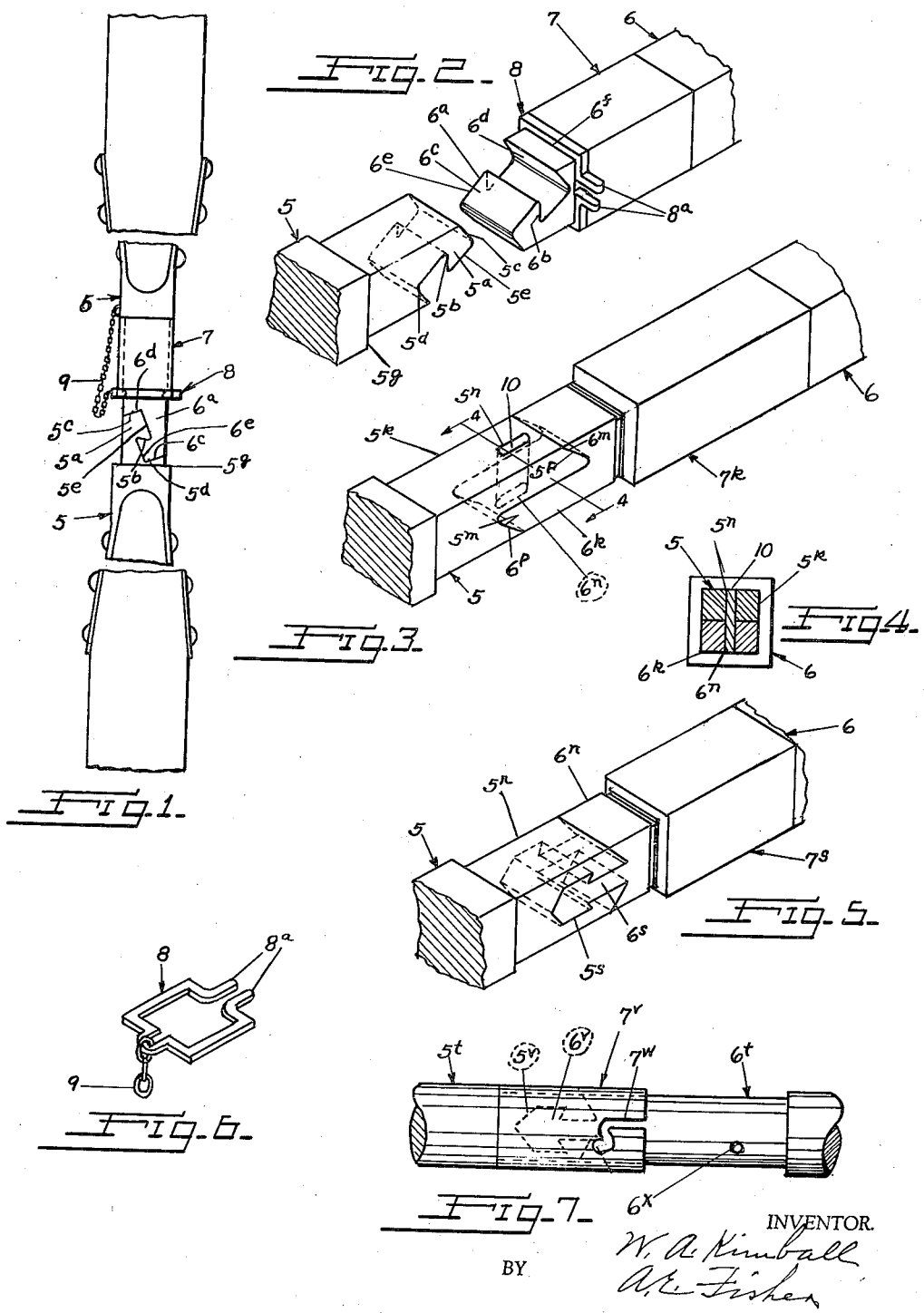
INVENTOR.
W. A. Kimball
A. E. Fisher
BY
ATTORNEY.

Patented May 13, 1941

2,242,078

UNITED STATES PATENT OFFICE 2,242,078

ROD COUPLING

Warren A. Kimball, Deming, N. Mex., assignor of forty-eight per cent to Grover C. Dawson, Silver City, N. Mex.

Application April 17, 1940, Serial No. 330,014

1 Claim. (Cl. 287—104)

This invention relates to shackles or couplings for releasably connecting two or more rod sections, such as pump or well rods or the like, for maintaining same in suitable or operative alignment in use.

The principal object of the invention is to provide a neat, compact and strong form of releasable coupling or shackle for joining rod sections end to end, with a sleeve slidable over the joint for reinforcing same, and with means for temporarily retaining the sleeve in its elevated or retracted position from the joint in the process of connecting or disconnecting the rod sections.

Another object is to provide rod sections having releasable interlocking formations at their ends whereby the rods may be unitarily pulled or pushed in the work to which they are applied, with releasable means such as a sleeve for slidably engaging and embracing the joint for holding the rod sections in operative end to end alignment.

With the foregoing objects in view together with such additional objects and advantages as may appear from the specification, certain preferred embodiments of the invention are shown in the drawing, wherein:

Figure 1 is an elevation of two square rod ends with integrally formed interlocking formations and showing a sleeve slidably mounted thereon in its raised position, a section being broken out of the upper and lower rods.

Figure 2 is an enlarged perspective view of the form of joint shown in Figure 1.

Figure 3 is a perspective view of a variant form of square joint, in the scale of Figure 2, showing a pin passed through the inter-engaged parts for holding same together.

Figure 4 is a section on the line 4—4 of Figure 3.

Figure 5 is a perspective view of still another variant form of square rod joint.

Figure 6 is a detail of the parted spring loop used for holding the sleeves of Figures 1 and 3 to their retracted positions.

Figure 7 is a side view of a round rod joint, and sleeve, the latter formed with a bayonet slot for engaging a pin on one rod end, for holding the sleeve retracted.

In practising the invention as shown in Figures 1 and 2, the square rod sections 5 and 6 have their ends complementally reduced and offset to opposite sides to form interlocking hooks or jaws 5a, 6a, the inner contacting margins or lips 5b, 6b of the hooks or jaws being formed on an acute angle so that longitudinal pulls on the two rods in opposite directions or outwardly, will tend to urge or slide the interlocked hooks or jaws more closely together. On the other hand the outer or remote end margins 5c, 6c of the complemental hooks or jaws are formed on an obtuse angle so as to flatly meet the complementally formed end margins 5d, 6d of the rod stocks, and whereby longitudinal convergent pushes or pressures on the two rods will likewise urge the interlocked parts together. With the parts so formed, the complemental hook or jaw parts are slid laterally together to form the joint.

The inner faces of the hooks or jaws 5a, 6a, are formed on lines 5e, 6e angularly connecting the inner and outer margins 5b, 5c, and 6b, 6c, as clearly shown in the drawing. The parts so formed are thought to be strongest, and least liable to break.

A squared tubular sleeve 7 is slidably mounted on one of the rod ends, preferably the upper rod end, and is adapted to slide down over the completed joint to the stop shoulder 5g, to hold same firm. To hold this sleeve in raised or retracted position while the parts are being fitted together, a groove 6f is formed around the upper rod and spaced from the end sufficiently to clear the sleeve 7 in its lowered or operative position. A squared, parted spring clip 8 formed with nibs 8a and dimensioned to neatly embrace the rod 6 and to snap into the groove 6f is attached to the rod section 6 by means of a chain 9.

In the use of the form of coupling described, the sleeve 7 is held to its raised position by snapping the clip 8 into the groove 6f, after which the complemental jaws or hooks 5a, 6a are slid together, the sleeve 7 released and lowered over the joint and the clip 8 reseated in its groove to hold the sleeve in place.

In the modification of Figure 3 the ends of the rods 5 and 6 are reduced to plain, laterally offset and overlapping jaws 5k, 6k, having their ends beveled inwardly as at 5p, 6p, for seating in the complemental recesses 5m, 6m, of the shanks, in a "toed in" relation. So formed, any inward pressure on the rods simply forces them together. The jaws are then slotted through medially in alignment as shown at 5n, 6n for engaging a key 10, which holds the rods together against pulls outwardly. A sleeve 7k is similarly slidably mounted on this assembly, to complete the joint.

In the modification of Figure 5, the rod ends 5r, 6r are formed with complementally interlocking T-shaped mortise 5s and tongue 6s to provide a mortise joint resisting either pulls or pressures longitudinally exerted. A reinforcing sleeve 7s is also slidably mounted on this joint.

In the modification of Figure 7, the rod ends 5t, 6t are rounded and formed with interlocking mortise 5v, and tongue 6v. A round sleeve 7v is mounted on the joint, the sleeve having a bayonet slot 7w for engaging a pin 6x set in the end of one of the rods. By this means the sleeve may be raised and turned for engaging pin and slot, for holding the sleeve elevated.

It is thought the use and operation of the several forms of the invention will be fully understood from the foregoing descriptions, and while I have here shown and described certain preferred forms of the invention, any desired modifications may be made therein, within the scope of the claim.

I claim:

In a rod coupling for joining upper and lower rods end to end, the upper rod being grooved circumferentially at a point substantially spaced from its end and both rods having overlapping and interlocking formations on their ends, a sleeve slidably mounted over the joint and retractable therefrom upon upper rod end carrying the groove, and a clip adapted to embrace the rod end carrying the groove and to releasably seat in the groove, for retaining the sleeve to either its raised or lowered position.

WARREN A. KIMBALL.